United States Patent
Bert et al.

(10) Patent No.: US 12,501,092 B2
(45) Date of Patent: Dec. 16, 2025

(54) DELIVERY PLATFORM FOR CINEMA CONTENT

(71) Applicant: BARCO NV, Kortrijk (BE)

(72) Inventors: Tom Bert, Kortrijk (BE); Diego Duyvejonck, Kortrijk (BE); Amitabh Modak, Kortrijk (BE)

(73) Assignee: BARCO NV, Kortrijk (BE)

( * ) Notice: Subject to any disclaimer, the term of this patent is extended or adjusted under 35 U.S.C. 154(b) by 7 days.

(21) Appl. No.: 18/718,911

(22) PCT Filed: Oct. 20, 2022

(86) PCT No.: PCT/EP2022/079235
§ 371 (c)(1),
(2) Date: Jun. 12, 2024

(87) PCT Pub. No.: WO2023/110194
PCT Pub. Date: Jun. 22, 2023

(65) Prior Publication Data
US 2025/0047920 A1    Feb. 6, 2025

Related U.S. Application Data

(60) Provisional application No. 63/288,755, filed on Dec. 13, 2021.

(51) Int. Cl.
*H04N 21/262* (2011.01)
*H04N 21/222* (2011.01)
(Continued)

(52) U.S. Cl.
CPC ..... *H04N 21/26241* (2013.01); *H04N 21/222* (2013.01); *H04N 21/231* (2013.01);
(Continued)

(58) Field of Classification Search
CPC .............. H04N 21/222; H04N 21/231; H04N 21/23805; H04N 21/2402;
(Continued)

(56) References Cited

U.S. PATENT DOCUMENTS 1,292,083 A * 1/1919 Name not available . A61F 5/08
606/199
1,805,640 A * 5/1931 Shindel .................. G02C 5/045
2/445
(Continued)

FOREIGN PATENT DOCUMENTS

JP    2007041899 A    2/2007

OTHER PUBLICATIONS

International Search Report and Written Opinion issued in PCT/EP2022/079235, dated Feb. 14, 2023, 15 pages provided.
(Continued)

Primary Examiner — Michael B. Pierorazio
(74) Attorney, Agent, or Firm — HSML P.C.

(57) ABSTRACT

A system for distributing digital cinema content (DCC) to cinemas integrates with content creators, distributors and cinemas. A backbone that includes a scheduling system operates to automatically transfer DCC to individual cinema IT systems. The scheduler ensures availability of DCC at a cinema IT system in advance of or at a show time. The system may automatically generate key delivery messages. The cinema IT systems may comprise cinema servers that include media players dedicated to specific screens. The cinema servers may be operated as federated server groups. DCC may be stored on any of the cinema servers and played back on any screens in a cinema.

25 Claims, 4 Drawing Sheets

(51) Int. Cl.
  *H04N 21/231*  (2011.01)
  *H04N 21/238*  (2011.01)
  *H04N 21/258*  (2011.01)
  *H04N 21/266*  (2011.01)
  *H04N 21/414*  (2011.01)

(52) U.S. Cl.
  CPC . *H04N 21/23805* (2013.01); *H04N 21/25833* (2013.01); *H04N 21/26606* (2013.01); *H04N 21/41415* (2013.01)

(58) Field of Classification Search
  CPC ....... H04N 21/25833; H04N 21/26216; H04N 21/26233; H04N 21/26241; H04N 21/26606; H04N 21/26613; H04N 21/41415; H04N 21/6334
  See application file for complete search history.

(56) References Cited

U.S. PATENT DOCUMENTS

| | | | | |
|---|---|---|---|---|
| 2,084,897 | A * | 6/1937 | Dym | A61F 9/028 2/437 |
| 2,294,561 | A * | 9/1942 | Kimball | G02C 5/045 2/445 |
| 2,386,175 | A * | 10/1945 | Fischer | G02C 5/045 74/25 |
| 5,533,503 | A * | 7/1996 | Doubek | A61F 13/0259 128/207.18 |
| 5,635,978 | A * | 6/1997 | Alten | H04N 7/025 725/43 |
| 6,889,325 | B1 * | 5/2005 | Sipman | H04L 63/126 380/37 |
| 7,653,921 | B2 * | 1/2010 | Herley | H04N 21/4332 382/199 |
| 7,913,326 | B1 * | 3/2011 | Barrows | A61F 9/022 2/430 |
| 7,991,770 | B2 * | 8/2011 | Covell | H04N 21/812 707/758 |
| 8,190,435 | B2 * | 5/2012 | Li-Chun Wang | G06F 16/683 704/270 |
| 8,510,770 | B1 * | 8/2013 | Oztaskent | H04H 60/56 709/201 |
| 8,893,192 | B1 * | 11/2014 | Bates | H04N 21/2143 725/74 |
| 9,119,708 | B2 * | 9/2015 | Wanderer | A61F 5/08 |
| 11,095,913 | B2 * | 8/2021 | Radford | H04N 21/2365 |
| 11,849,175 | B2 * | 12/2023 | Akkaraju | H04N 21/4367 |
| 2002/0072982 | A1 * | 6/2002 | Barton | G06Q 30/0625 705/14.1 |
| 2003/0188188 | A1 * | 10/2003 | Padmanabhan | H04L 9/0833 380/279 |
| 2004/0055009 | A1 * | 3/2004 | Hayashida | H04N 21/47 725/39 |
| 2004/0143349 | A1 * | 7/2004 | Roberts | G06F 16/40 704/278 |
| 2004/0163110 | A1 * | 8/2004 | Won | H04N 21/435 725/50 |
| 2005/0028195 | A1 * | 2/2005 | Feinleib | H04N 7/163 725/135 |
| 2005/0144455 | A1 * | 6/2005 | Haitsma | G06F 16/683 713/176 |
| 2005/0192863 | A1 * | 9/2005 | Mohan | G06Q 30/02 705/14.27 |
| 2006/0098159 | A1 * | 5/2006 | Canavan | G02C 9/04 351/57 |
| 2006/0224452 | A1 * | 10/2006 | Ng | G06Q 30/0242 705/14.27 |
| 2006/0256133 | A1 * | 11/2006 | Rosenberg | G06F 3/013 345/619 |
| 2007/0124756 | A1 * | 5/2007 | Covell | G06F 16/635 348/E7.071 |
| 2007/0179850 | A1 * | 8/2007 | Ganjon | G06Q 30/00 705/14.27 |
| 2007/0212019 | A1 * | 9/2007 | Kimura | H04N 21/84 386/291 |
| 2008/0049704 | A1 * | 2/2008 | Witteman | H04H 60/58 370/342 |
| 2008/0082510 | A1 * | 4/2008 | Wang | G06F 16/683 |
| 2009/0313670 | A1 * | 12/2009 | Takao | H04N 21/47 725/110 |
| 2010/0114713 | A1 * | 5/2010 | Anderson | G06Q 20/10 705/14.69 |
| 2011/0071838 | A1 * | 3/2011 | Li-Chun Wang | G10L 25/54 704/E11.001 |
| 2011/0273455 | A1 * | 11/2011 | Powar | G11B 27/10 345/473 |
| 2011/0283319 | A1 * | 11/2011 | Davis | H04N 21/2665 725/39 |
| 2012/0295560 | A1 * | 11/2012 | Mufti | H04B 13/00 455/95 |
| 2012/0297400 | A1 * | 11/2012 | Hill | G06F 9/445 719/318 |
| 2012/0316969 | A1 * | 12/2012 | Metcalf, III | G06Q 30/0269 705/14.66 |
| 2013/0029762 | A1 * | 1/2013 | Klappert | A63F 13/792 463/31 |
| 2013/0031579 | A1 * | 1/2013 | Klappert | H04N 21/812 725/32 |
| 2013/0042262 | A1 * | 2/2013 | Riethmueller | H04N 21/25866 725/14 |
| 2013/0044051 | A1 * | 2/2013 | Jeong | H04N 21/42222 345/156 |
| 2013/0067512 | A1 * | 3/2013 | Dion | G06Q 30/02 725/32 |
| 2013/0073366 | A1 * | 3/2013 | Heath | G06Q 30/0261 705/14.25 |
| 2013/0073377 | A1 * | 3/2013 | Heath | G06Q 30/02 705/14.39 |
| 2013/0080242 | A1 * | 3/2013 | Alhadeff | G06F 16/957 705/14.39 |
| 2013/0080262 | A1 * | 3/2013 | Scott | G06Q 30/02 705/14.68 |
| 2013/0085828 | A1 * | 4/2013 | Schuster | G06Q 30/0207 705/14.39 |
| 2013/0111519 | A1 * | 5/2013 | Rice | G06Q 30/02 725/34 |
| 2013/0124073 | A1 * | 5/2013 | Ren | G08G 1/00 701/118 |
| 2014/0115761 | A1 * | 5/2014 | Mcneal | G02C 5/122 2/439 |
| 2014/0196070 | A1 * | 7/2014 | Moskowitz | H04N 21/6582 725/19 |
| 2015/0082349 | A1 * | 3/2015 | Ishtiaq | H04N 21/4316 725/40 |
| 2015/0143416 | A1 * | 5/2015 | Onno | H04N 21/8358 725/34 |
| 2015/0216710 | A1 * | 8/2015 | Wanderer | A61M 16/0694 606/204.45 |
| 2015/0222950 | A1 * | 8/2015 | Sant | H04N 21/84 725/18 |
| 2015/0229979 | A1 * | 8/2015 | Wood | H04N 21/4663 725/14 |
| 2016/0337426 | A1 * | 11/2016 | Shribman | H04L 65/65 |
| 2016/0373685 | A1 * | 12/2016 | Duan | H04N 5/268 |
| 2018/0184160 | A1 * | 6/2018 | Cain | H04N 21/44016 |
| 2019/0007729 | A1 * | 1/2019 | Heffernan | H04H 60/43 |
| 2019/0130136 | A1 * | 5/2019 | Claypool | H04N 21/25875 |

OTHER PUBLICATIONS

Dario Di Sorte et al, "Network Distribution of Digital Cinema Contents", 16th Ist Mobile and Wireless Communications Summit, 2007 IEEE Piscataway, NJ, USA,, Jul. 1, 2007 (Jul. 1, 2007), p. 1-5, XP031132456 ISBN: 9781424416622.

* cited by examiner

DELIVERY PLATFORM FOR CINEMA CONTENT

CROSS-REFERENCE TO RELATED APPLICATION

This application claims priority from U.S. application No. 63/288,755 filed 13 Dec. 2021 and entitled DELIVERY PLATFORM FOR CINEMA CONTENT which is hereby incorporated herein by reference for all purposes. For purposes of the United States of America, this application claims the benefit under 35 U.S.C. § 119 of U.S. application No. 63/288,755 filed 13 Dec. 2021 and entitled DELIVERY PLATFORM FOR CINEMA CONTENT which is hereby incorporated herein by reference for all purposes.

FIELD

This invention relates to delivering digital cinema content ("DCC") such as movies to cinemas. The invention may be embodied, for example, in systems for delivering digital cinema content and methods for delivering digital cinema content.

BACKGROUND

Movies were formerly delivered to cinemas as physical film stored on reels. In order to show a movie the cinema would need to take physical delivery of the corresponding reels of film, and load the reels into optical movie projectors. To display a movie on more than one screen at the same time required a separate set of reels of film for each screen. After being projected several times any particular copy of a movie could be degraded through repeated handling, projector malfunctions and the like.

The advent of digital projectors capable of projecting movies from digital files addressed some of the problems that were inherent in distributing movie reels but introduced new problems relating to areas such as managing extremely large digital files, protecting against piracy, and providing the infrastructure for projecting movies from digital files.

The business of distributing DCC to cinemas is fractured. DCC is generated by various production houses. Different distributors acquire rights to distribute individual films to cinemas in different markets and geographical regions. Typically DCC is delivered from a distributor to a cinema through a number of intermediary entities. For example, it is not unusual for DCC to be delivered from a distributor to a cinema for a route such as:
  (i) the distributor places the DCC on a server and then transfers the DCC to a server of a delivery company;
  (ii) the delivery company receives the DCC at a server and then transfers the DCC to a cache server controlled by the delivery company on site in a cinema;
  (iii) a theatre management company has permissions to access the cache server and uses those permissions to transfer the DCC from the cache server to a library server in the cinema; and
  (iv) a theater management system copies the DCC from the library server to a media server connected to a digital projector associated with a specific screen on which the DCC will be played back.

This distribution model requires multiple transfers of the DCC among different servers controlled by different entities. Each transfer introduces a risk that the digital content may become one or both of corrupted and pirated.

With current arrangements for distributing digital cinema content, cinemas need to invest in, host and maintain plural different cache servers or other mechanisms for receiving DCC if they wish to screen digital content from plural distributors. Distributors of DCC also need to invest in computer infrastructure for receiving DCC from different content creators and distributing the DCC to cinemas. This can involve significant duplication of systems and effort all of which contribute to significant costs.

The inventors have recognized a need for improved technologies for distributing digital content to cinemas.

SUMMARY

This invention has a number of aspects. These include, without limitation:
  Systems and methods for delivering digital cinema content;
  Systems and methods for delivering digital content using federated server groups;
  Systems and methods for managing federated server groups of cinema servers;
  Systems and methods for centralizing distribution of digital cinema content;
  Systems and methods for simultaneously delivering DCC during active playback;
  Schedule-based systems and methods for distributing digital content to cinemas.

The invention includes the following non-limiting example aspects.

One aspect of the invention provides a system for distributing and managing digital cinema content. The system comprises one or more cinema IT systems. Each of the one or more cinema IT systems is associated with a cinema and comprises a plurality of cinema servers. Each of the plurality of cinema servers comprises a data store. One or more of the cinema servers comprises a media player associated with a corresponding screen. The system also comprises a backbone configured to selectively deliver the digital cinema content to one or more of the cinema IT systems. The backbone comprises one or more backbone data stores configured to receive and store the digital cinema content; and a scheduler configured to initiate transfer of copies of the digital cinema content from the backbone to individual ones of the cinema IT systems. The scheduler is configured to: determine a delivery deadline for delivering an item of the digital cinema content to one of the cinema IT systems based at least in part on a scheduled show time for the item of digital content by the cinema IT system; estimate an estimated amount of time required to transfer the copy of the digital cinema content from the backbone data store to the cinema IT system; and determine a start time for the transfer that is earlier than the delivery deadline by at least the estimated amount of time.

The backbone may, for example comprise cloud based servers and data stores. The scheduler may be implemented by software instructions executing on a cloud based or other internet connected server computer.

In some embodiments, in one of more of the cinema IT systems the cinema servers are associated to form a federated server group. The federated server group may provide each of the media players of the cinema IT system with access to digital cinema content partially or wholly stored in the data store of any of the cinema servers in the federated server group.

In some embodiments, within the federated server group one or more of the cinema servers manages the federated server group. The management may comprise one or more of determining where and how to store digital cinema content, receiving digital cinema content without disrupting playback, adding cinema servers to the federated server group and removing cinema servers from the federated server group.

In some embodiments, the federated server group is configured to throttle the rate at which digital cinema content is transferred to, from or within the federated server group.

In some embodiments, the federated server group shares one or both of processing capacity and the transfer capacity of one or more cinema servers with the system.

In some embodiments, the federated server group provides a network attached storage (NAS) interface for receiving the transferred digital cinema content from the backbone.

In some embodiments, the system comprises a predictive model based on historical data traffic measurements in data connections between the backbone and the cinema IT systems and the scheduler applies the predictive model to predict future traffic levels on the data connections and to estimate the estimated amount of time required to transfer the copy of the digital cinema content from the backbone data store to the cinema IT system.

In some embodiments, the system comprises an ordering interface that aggregates information about items of digital cinema content available from the distributor servers and receives orders for delivering selections of the available items of digital cinema content to the cinema IT systems. In some embodiments, the orders request permission to playback the ordered items of digital cinema content on specific ones of the screens associated with one of the cinema IT systems. The media players associated with the screens may each have a corresponding public key. The system may be configured to automatically generate for each of the ordered items of digital cinema content at least one Key Delivery Message (KDM) which contains a decryption key for the ordered item of digital cinema content that has itself been encoded using the public key of the corresponding media player.

In some embodiments, the system comprises one or more distributor servers configured to receive digital cinema content for distribution to cinemas.

In some embodiments, one or more of the cinema servers comprises a 5G module.

In some embodiments, the system comprises an online user interface that provides information about one or both of the cinema IT systems and the cinema servers.

In some embodiments, the system comprises an interface that communicates information regarding scheduled screenings of items of DCC the cinema IT systems along with status information regarding specific items of DCC required for scheduled screenings of the specific items of DCC. The status information includes at least information indicating that specific items of DCC have been received and verified at a respective cinema IT system and information indicating that other specific items of DCC have not yet been received by the respective cinema IT system. The status information may also include more detailed information such as one or more start times for individual items of DCC, and/or expected completion times for transfer of individual items of DCC to a cinema IT system.

Another non-limiting aspect of the invention provides a system for distributing and managing digital cinema content. The system comprises one or more cinema IT systems. Each of the one or more cinema IT systems is associated with a cinema and comprises a plurality of cinema servers. Each of the plurality of cinema servers comprises a data store and a media player associated with a corresponding screen of the cinema. The system also comprises a backbone configured to selectively deliver the digital cinema content to one or more of the cinema IT systems. The backbone comprises one or more backbone data stores configured to receive and store the digital cinema content; and one or more backbone servers configured to transfer copies of the digital cinema content from the backbone data stores to one or more of the cinema servers of each of one or more of the cinema IT systems, the backbone in cooperation with the one or more of the cinema IT systems is configured to schedule and execute the transfers of the copies of the digital cinema content to meet corresponding delivery deadlines while throttling a data rate of the transfer and/or pausing the transfer and/or inhibiting executing the transfer at times corresponding to: the one or more of the cinema servers having a load higher than a thresh-old; and/or the one or more cinema IT systems having a load higher than a threshold; and/or a data communication link to the cinema IT system having traffic higher than a threshold.

In some embodiments, the system comprises a scheduler configured to: determine the delivery deadline for delivering the item of the digital cinema content to one of the cinema IT systems based at least in part on a scheduled show time for the item of digital content by the cinema IT system; estimate an estimated amount of time required to transfer the copy of the digital cinema content from the backbone data store to the cinema IT system; and determine a start time for the transfer that is earlier than the delivery deadline by at least the estimated amount of time.

In some embodiments, the scheduler is configured to predict a load on the one or more of the cinema servers and/or the one or more cinema IT systems based on a schedule of show times for the cinema IT system and to base the start time at least in part on the predicted load.

Another non-limiting aspect provides a method for distributing and managing digital cinema content (DCC). The method comprises: at a content delivery backbone, receiving an item of DCC and storing the item of DCC in one or more backbone data stores. The method accesses data comprising a scheduled show time for the item of DCC by each of one or more cinema IT systems and determines a delivery deadline for delivering the item of DCC to each of the one or more cinema IT systems based at least in part on the respective scheduled show time for the item of DCC by the cinema IT system. The method determines an estimated transmission time to transfer a copy of the item of DCC from the backbone data store to each of the one or more cinema IT systems. For each of the one or more cinema IT systems the method determines a respective start time for the transfer of the copy of the item of DCC to the cinema IT system that is earlier than the delivery deadline by at least the estimated amount of time; and at the respective start time commencing transferring the copy of the item of DCC to the cinema IT system.

In some embodiments, for at least one of the cinema IT systems, transferring the copy of the item of DCC to the cinema IT system comprises transferring the copy of the item of DCC to a network attached storage (NAS) interface associated with the respective cinema IT system.

In some embodiments, for at least one of the cinema IT systems, estimating an amount of time required to transfer a copy of the item of DCC from the backbone data store to the cinema IT systems is based at least in part on estimates of future traffic levels in data connections between the backbone and the cinema IT system generated by a predictive model based on historical data traffic measurements in the data connections between the backbone and the cinema IT system.

In some embodiments, each of the cinema IT systems comprises one or more media player, each of the one or more media player is associated with a corresponding screen and each of the one or more media player has a public key. In such embodiments the method may include, for each of the one or more cinema IT systems: automatically generating for the item of digital content at least one Key Delivery Message (KDM) which contains a decryption key for the copy of the item of digital content that has itself been encoded using the public key of a media player of the one or more media player for the cinema IT system.

In some embodiments the method comprises accessing a data store containing records of orders for showings of items of digital cinema on the screens associated with media players of the one or more cinema IT systems; and, for each of the one or more cinema IT systems: identifying records of orders corresponding to showings of the item of digital content on teach of a plurality of screens associated with the cinema IT system. For each of the cinema IT systems the at least one KDM comprises a plurality of KDMs for the item of digital content, each of the plurality of KDMs encoded using the public key associated with a media player associated with a respective one of the plurality of screens.

In some embodiments, determining the respective start time is based on one or more of: a size of the item of DCC; where the item of DCC is stored in the backbone; bandwidths of data connections between where the item of DCC is stored in the background and the cinema IT system; expected traffic on the data connections between where the item of DCC is stored in the background and the cinema IT system; and the availability of data storage on the cinema IT system.

In some embodiments, determining the respective start time is based on expected traffic on a data connection that terminates at the cinema IT system.

In some embodiments, determining the estimated transmission time for the item of DCC. is based on the size of the item of DCC, the location from which the item of DCC will be transferred to the cinema IT system, a bandwidth of connections by which the copy of the item of DCC will be transmitted, and estimated traffic on the connections.

In some embodiments, determining the estimated transmission time for the item of DCC takes into account an effect of other items of DCC being transferred by the backbone.

In some embodiments, the method comprises throttling a transfer rate for the item of DCC to at least one of the cinema IT systems. In some embodiments, the throttling is performed in response to determining that at least one item of streamed DCC is being streamed to the at least one of the cinema IT systems.

In some embodiments, the method comprises setting the respective start times to be times when the respective cinema IT system and/or data communication links connecting to the respective cinema IT system will be operating at low capacity.

In some embodiments, setting the respective start times comprises setting the respective start times to occur after midnight and before noon local time of the respective cinema IT system.

In some embodiments, determining the start time for a respective one of the cinema IT systems comprises determining available storage capacity for the respective one of the cinema IT systems at times leading up to the latest start time that will deliver the item of DCC 102 by the corresponding delivery deadline and determining whether to set the start time to be earlier than the latest start time based on the available storage capacity of the respective cinema IT system.

In some embodiments, the one or more cinema IT systems comprises a plurality of cinema IT systems; and the method comprises delivering the item of DCC simultaneously to the plurality of cinema IT systems, for example by multicasting.

In some embodiments the method comprises providing an interface that communicates information regarding scheduled screenings of the item of DCC for a cinema along with status information regarding the status of specific items of DCC required for the scheduled screenings.

In some embodiments the method comprises receiving upload authorization from a distributor to upload an item of DCC from a server associated with the distributor to the backbone.

In some embodiments the method comprises receiving distribution authorization from the distributor to transfer the item of DCC from the backbone to one or more of the one or more cinema IT systems. In some embodiments, the distribution authorization specifies one or more specific screen(s) on which the item of digital content is authorized to be played. In some embodiments the distribution authorization specifies times when the item of digital content may be played.

In some embodiments, transferring the copy of the item of DCC to the cinema IT system comprises delivering the copy of the item of DCC to a data storage location in the cinema IT system from which the copy of the item of DCC 102 may be played on a specific screen for which playing of the item of DCC is authorized without further transferring the copy of the item of DCC within the cinema IT system.

In some embodiments the method comprises regulating a rate of transfer of the copy of the DCC to the cinema IT system based on a current load being experienced by the cinema IT system.

In some embodiments the method comprises regulating a rate of transfer of the copy of the DCC to the cinema IT system based on current traffic levels on data links through which the copy of the DCC is being delivered to the cinema IT system.

Another aspect of the invention provides methods for delivering digital cinema content as described herein and/or depicted in the accompanying drawings.

Another aspect of the invention provides apparatus having any new and inventive feature, combination of features, or sub-combination of features as described herein.

Another aspect of the invention provides methods having any new and inventive steps, acts, combination of steps and/or acts or sub-combination of steps and/or acts as described herein.

Further aspects and example embodiments are illustrated in the accompanying drawings and/or described in the following description.

It is emphasized that the invention relates to all combinations of the above features, even if the features are recited in different claims, illustrated in different drawings, and/or described in different sections, paragraphs or sentences.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
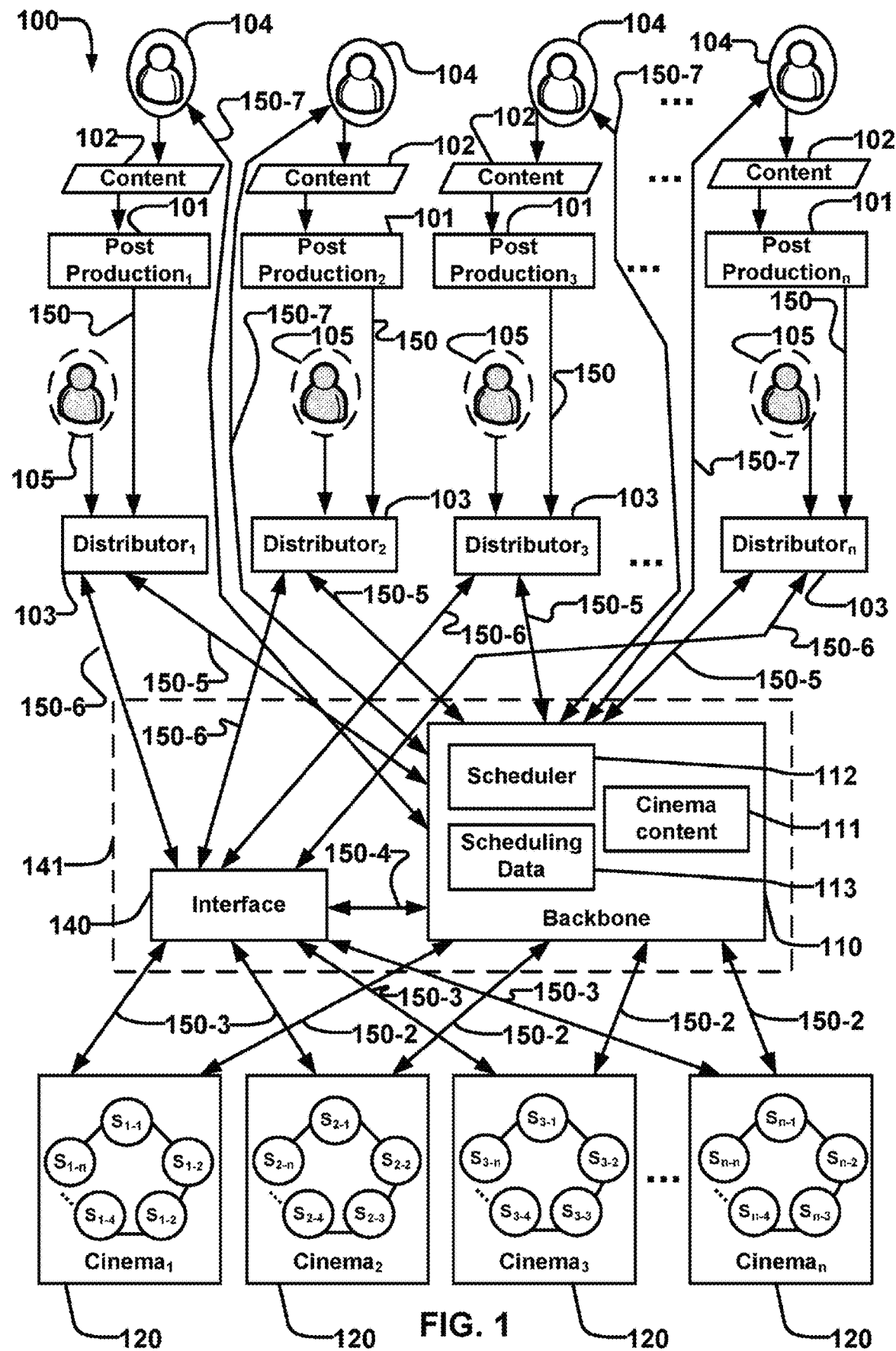
FIG. 1 is a schematic diagram depicting an example cinema management system for cinema content delivery.

FIG. 1 is a schematic view of an example cinema management system 100. Cinema management system 100 incorporates a number of features that may be applied in combination, as described, or in any sub-combinations or individually. These features include, without limitation:

A single system configured to allow participation of multiple stakeholders who play different roles in making available and delivering digital cinema content. The stakeholders may include linked IT systems associated with one or more cinemas, one or more distributors, one or more post-productions units, etc. Providing a unified single system such as system 100 can simplify, enhance reliability and/or speed up delivery of digital cinema content.

A backbone configured to:
  automatically schedule delivery of DCC to cinema IT systems, federated server groups and/or specific servers based on scheduling data that may comprise one or more of show times, latest delivery date, destination (e.g. server, screen, federated server group etc.), storage available, server congestion and network congestion. The scheduling may take into account factors such as available bandwidth, estimated time required to transfer specific DCC to a destination, other scheduled transfers of digital cinema content, scheduled show times at a cinema IT system and/or available storage to ensure that the specific DCC is available at a cinema IT system to be played on one or more screens at corresponding show times;
  deliver DCC to one or more cinema IT systems, one or more federated server groups and/or one or more servers; and/or
  behave as a temporary central storage which receives DCC from distributor servers and stores such content until delivery to one or more cinema IT systems, one or more federated server groups and/or one or more servers.

A cinema IT system comprising a federated server group which joins a plurality of servers within the cinema IT system to aggregate the storage available on the plurality of servers while facilitating playback by way of media players associated with some or all of the plurality of servers.

A federated server group comprising a plurality of servers within which each of the plurality of servers comprises computer software executable by the server and configured to, when executed by the server:
  manage the federated server group alone or in cooperation with some or all other ones of the plurality of servers of the federated server group; and
  serve as a communication link between one or both of other servers within the federated server group and parties external to the federated server group.

A network linking aspects of cinema management system 100. The network designed to allow for the relatively fast transfer of DCC between elements such as distributor servers, backbone and cinema IT system servers.

A cinema IT system configured in ways described herein to facilitate uninterrupted playback of DCC concurrently with delivery of additional content and/or management of the federated server group.

A cinema management system 100 as described herein that includes features to facilitate scaling the cinema management system 100 to operate with a larger number of cinema IT systems and/or a large number of cinema servers. For example, such a system may be scaled to comprise one or both of: 1000 or more cinema IT systems and 40,000 or more servers across any number of cinema IT systems.

Cinema management system 100 comprises a network of computers connected by data communication links. System 100 provides an integrated platform for providing DCC from plural sources (content creators and distributors) to plural consumers (cinemas). System 100 includes features that simplify distribution of DCC, make distribution of DCC more reliable, reduce complexity compared to current systems, reduce the risk of piracy, and simplify management of DCC within a cinema (particularly a cinema that has multiple screens). Not all embodiments of the invention include all of the features of the illustrated system 100.

The example system 100 shown in FIG. 1 includes one or more post-production servers 101. Post-production servers 101 are associated with content creators 104 who generate DCC 102. DCC 102 may, for example, comprise one or more of movies, advertisements, short films, shows, recorded events (e.g. plays, concerts, operas, etc.), streamed content (e.g. streamed live opera performances, streamed live drama performances, streamed live music concerts, streamed sports events, etc.) etc.

Content creators 104 may be any source of DCC 102. For example, some or all of content creators 104 may be post-production organizations who prepare movies or other DCC 102 for release in different markets. Content creators 104 may, for example, perform one or more of post-production editing, adding music and other sound track effects, adding visual effects, adding credits, etc. DCC 102 prepared by content creators 104 may be ready to be played in cinemas in one or more markets. Content creators 104 may additionally or alternatively include broadcasters of streamed events.

Content creators 104 may save DCC 102 that they have prepared for distribution on post-production servers 101. FIG. 1 depicts each content creator 104 saving DCC 102 on one post-production server 101. However any particular content creator 104 may have rights to save DCC 102 on plural post-production servers 101.

Although system 100 may function with a single post-production server 101, system 100 advantageously includes plural production servers 101. The inclusion in system 100 of plural post-production servers 101 associated with different content creators 104 advantageously facilitates use of system 100 by cinemas to schedule, obtain and manage a full range of DCC 102 originating from multiple content creators 104 in a single system. In general, a cinema will want to include DCC 102 from multiple content creators 104 in its offerings because the field of producing DCC 102 is fragmented, with several large production studios and many smaller independent content producers.

When a content creator 104 wishes to make available an item of DCC 102, the content creator 104 may store the item of DCC 102 in a corresponding post-production server 101. The content creator 104 may store multiple items of DCC 102 in a corresponding post-production server 101.

In the cinema business, cinemas usually contract with distributors 105 to obtain DCC 102. Different distributors 105 may have rights to distribute DCC 102 from different content creators 104 in different geographical regions and/or different market segments. A distributor 105 may be responsible for adjusting DCC 102 to suit particular geographical regions or market segments. For example, the distributor 105 may be responsible for generating subtitles in one or more languages and/or dubbing in one or more languages. System 100 may be configured to deliver DCC 102 from content creators 104 to one or more distributors 105.

In the illustrated embodiment, system 100 includes distributor servers 103. Each distributor server 103 is associated with a distributor 105. A distributor 105 may augment DCC 102 received at a corresponding distributor server 103. For example, the distributor 105 may add subtitles in a language pertinent to the region in which the distributor deals in preparation for distributing the DCC 102 to the region.

System 100 may be configured to:
  automatically deliver DCC 102 to a specific distributor server 103 (e.g. for the case where a particular distributor 105 distributes all DCC 102 from a particular content creator 104).
  automatically deliver all DCC 102 to a specific plurality of distributor servers 103 (e.g. for the case where a content creator 104 uses particular distributors 105 to distribute DCC 102 in different regions or market segments).
  allow the content creator 104 to specify one or more distributor servers 103 for each item of DCC 102.

A content creator 104 may control system 100 to transfer one or more items of DCC 102 to one or more distributors 105 at specified times. System 100 may provide a control panel or interface which allows the content creator 104 to:
  transfer items of DCC 102 from a computer system of content creator 104 to the corresponding post-production server 101;
  cause the corresponding post-production server 101 to transfer any of the items of DCC 102 to each of one or more distributor servers 103;
  control the time(s) at which the transfer(s) take place.

Post-production servers 101 and distributor servers 103 may be separated from other computer systems used by content creators 104 and distributors 105 respectively. This separation may improve the overall reliability and resistance to piracy of system 100. Post-production servers 101 and distributor servers 103 may be configured to:
  have functionality limited to what is required by system 100;
  only accept data of specific types corresponding to DCC 102;
  check each received item of DCC 102 for errors and to verify that it is DCC 102;
  transfer accepted items of DCC 102 only to destinations within system 100.

Post productions servers 101 and distributor servers 103 may be protected by computer firewalls from other computers operated by content creators 104 and distributors 105 respectively.

FIG. 1 depicts each post-production server 101 sending DCC 102 to one distributor server 103. However any distributor server 103 may receive DCC 102 from one or more post-production servers 101 and post productions servers 101 may send DCC 102 to any number of distributor servers 103.

In some embodiments a content creator 104 may also operate as a distributor 105 in which case the content creator 104 may be associated with both a post-production server 101 and a distributor server 103 or only a distributor server 103.

The inclusion in system 100 of post-production servers 101 and distributor servers 103 provides a fast, flexible, safe, consistent and convenient way for content creators 104 to deliver DCC 102 to distributors 105 and for that DCC 102 to eventually be distributed to cinemas.

Cinema management system 100 comprises backbone 110. Backbone 110 functions to deliver cinema content 102 from distributor servers 103 to cinema IT systems 120 associated with cinemas. Since system 100 includes distributor servers 103 for multiple distributors 105, a cinema IT system 120 can receive DCC 102 from any of the distributors 105 by way of system 100 in a consistent manner.

For streamed events (e.g. streamed live music concerts, streamed live sporting events, etc.) content creators 104 may directly stream DCC 102 to backbone 110 without previously uploading to one or both of post-production servers 101 and distributor servers 103. Backbone 110 may replicate and deliver the streamed content to individual cinema IT systems 120 for real time and/or delayed playback.

Backbone 110 may include data stores 111 that may be applied as a temporary centralized storage system for cinema management system 100. Particularly, backbone 110 may receive DCC 102 to be distributed to one or more cinema IT systems 120 from one or more distributor servers 103. Backbone 110 may then temporarily store the received DCC 102 or parts of DCC 102 in data stores 111.

As described below, system 100 causes backbone 110 to subsequently deliver DCC 102 to cinema IT systems 120 that have requested the DCC 102 in a schedule that ensures that the DCC 102 has been received intact in the cinema IT systems 120 in good time before a scheduled showing of the DCC 102. Backbone 110 may relay DCC 102 to cinema IT system(s) as it receives it (i.e. portion by portion) or after the entirety of DCC 102 has been received.

In some embodiments, backbone 110 handles different types of DCC differently. For example if DCC 102 comprises a streamed event backbone 110 may relay DCC 102 as it receives it to cinema IT system(s) 120. For example if DCC 102 comprises a pre-set event (e.g. a movie) backbone 110 may wait to deliver the DCC 102 to cinema IT system(s) 120 until it has received and stored all of the DCC 102.

Backbone 110 may, for example comprise one or more servers which may, for example, be hosted on sites of an operator of cinema management system 100 and/or on cloud storage. The servers of backbone 110 may be geographically distributed to facilitate rapid delivery of items of DCC 102 to cinemas around the world.

DCC 102 often requires sizeable amounts of storage. For example a feature length movie in a digital format suitable for projecting high quality images by a digital cinema projector typically has a size of 250 GB or more. Longer playing DCC 102 in higher resolution formats may have sizes of 1 TB or more. Backbone 110 may contain sufficient storage capacity to store a large number of items of DCC 102 that are available for distribution to cinemas.

Because each item of DCC 102 typically comprises a large amount of data, system 100 includes a sufficiently large amount of data storage for DCC 102. Another issue resulting from the large size of each item of DCC 102 is that transferring a copy of an item of DCC 102 from one part of system 100 to another is not instantaneous or near-instantaneous but can take a significant amount of time.

DCC 102 is often stored in files although other data structures may be used. One item of DCC 102 may be split between a plurality of files or other data structures. For example a movie may comprise a video file containing images to be projected, one or more audio files containing sounds to be played and one or more subtitle files containing subtitles in one or more languages. Together a set of these files may be provided in a Digital Cinema Package (DCP). DCPs destined for different markets may include audio and/or subtitles in different languages. There are standard formats for DCPs including SMPTE DCP as defined by SMPTE standard 429-2 Digital Cinema Packaging and the earlier Interop DCP.

Post production servers 101, distributor servers 103, backbone 110, content creators 104 and cinema IT systems 120 are connected to one another by data links 150. Data links 150 may include dedicated data links and/or data links provided by Internet infrastructure and/or satellite data links. Ideally all of data links 150 are high speed data links however this is not always possible. Some towns and cities in which cinema IT systems 120 may be located are served only by relatively low bandwidth data connections.

The present inventors have recognized significant logistical problems in making DCC 102 available for scheduled showings. Because of the large size of DCC 102 it can take a significant time to deliver digital content 102 from one server to another, even on faster currently available communications channels. Even a local transfer over a modern local network in a cinema (e.g. from a cache server to library server or from a library server to a media server) can require as much as 1 to 2 hours to complete. Inter-site transfers can require longer times (e.g. up to 12 to 18 hours) to complete. These long transfer times can significantly complicate the logistics required to make sure that each movie or other piece of DCC 102 is received intact and available for playback by the correct media player(s) together with the correct permissions in time for a scheduled showing.

System 100 comprises a scheduler 112. Scheduler 112 uses scheduling data 113 to schedule delivery of DCC 102 from backbone 110 to specific cinema IT systems 120. For each delivery of a specific item of DCC 102 to a specific cinema IT system 120, scheduler 112 determines a delivery deadline by which the specific item of DCC 102 must have been delivered intact to the specific cinema IT system 120. DCC 102 that is streamed may be scheduled for delivery to each of one or more cinema IT system(s) 120 in real time or near real time as it occurs. For DCC 102 that includes fixed (pre-set) content the DCC 102 may be scheduled for delivery to specific cinema IT system(s) 120 in sufficient time to be received at the cinema IT system(s) and ready for playback before a first scheduled showing at the cinema IT system 120.

The delivery deadline for a specific pre-set DCC 102 may be determined by working backward from a first scheduled screening time for the specific DCC 102 at a specific cinema IT system 102. System 100 may, for example, be configured to set the delivery deadline long enough before the first scheduled showing time for the specific DCC 102 to verify that the specific DCC 102 has been received completely and intact, if necessary, to move the specific DCC 102 within the cinema IT system 120 to a storage location from which the specific DCC 120 can be played on a specific screen and optionally long enough before the first scheduled screening to allow the specific DCC 102 to be retransmitted to the cinema IT system 120 if something goes wrong.

Based on the delivery deadline and information regarding the specific DCC 102, system 100 schedules steps required to meet the delivery deadline. These steps may be scheduled taking into account factors such as:

- The size of the specific item of DCC 102;
- Where the specific item of DCC 102 is stored on backbone 110;
- Bandwidth of data connections 150 between the current location of the specific item of DCC 102 and the destination cinema IT system 120;
- Expected traffic on data connections 150 (especially the data connection 150 that terminates at the cinema IT system 120) (e.g. traffic from scheduled streamed DCC 102 and other scheduled deliveries of DCC 102);
- The processing resources (e.g. the processing ability accounting for playback activity, etc.) of cinema IT system 120; and
- The availability of data storage on the cinema IT system 120.

In some embodiments system 100 determines a scheduled start time at which to commence transferring the specific DCC 102 to a cinema IT system 120 by steps including:

- Estimating an amount of time required to deliver the specific DCC 102 to the cinema IT system 120 (an "estimated transmission time"). The estimated transmission time may be based on the size of the specific DCC 102, the location from which the specific DCC 102 will be transferred, the bandwidth of connections 150, the expected transfer rate and estimated traffic on connections 150 (including other items of DCC 102 that system 100 may be transferring).
- Optionally increasing the estimated transmission time by a safety factor.
- Subtracting the estimated transmission time from the delivery deadline.

In some embodiments scheduler 112 is configured to specify a maximum data transfer rate for delivery of certain DCC. Scheduler 112 may set a reduced maximum data transfer rate (i.e. throttle the transfer rate) in order to prevent the transfer of a DCC from causing problems such as: data congestion that could interfere with delivery of a scheduled streamed DCC 102, consuming processing resources or bandwidth in a cinema IT system 120 that could interfere with playback of a DCC on a screen 124, data congestion that would undesirably delay completion of transfer of another DCC 102 etc.

In determining the estimated transmission time, scheduler 112 may apply data from various sources. These sources may include scheduling data 113 which may, for example, comprise one or more of:

- a schedule of show times for cinema IT system 120 including any show times for streamed DCC 102;
- data storage available in the cinema IT system 120;
- information (e.g. size) regarding the specific item of DCC 102 and possibly other items of DCC 102 in system 100;

scheduled times for other items of DCC 102 to cinema IT system 120;

activity occurring within cinema IT system 120 including scheduled and current activity (e.g. playing DCC 102).

Scheduler 112 may also take into account information regarding expected and typical usage of data connections 150. This information may be obtained for example from historical traffic measurements of traffic on data connections 150 and/or past, present and future show time schedules from cinema IT system 120. This information may include traffic on data connections 150 that does not originate from system 100.

In some embodiments, system 100 includes a predictive model based on the historical traffic measurements that may be applied to predict future traffic levels on data connections 150 at times when it is planned to transmit DCC 102 to a particular cinema IT system 120.

It is not necessary for transmission of a specific item of DCC 102 to a cinema IT system 120 to be timed to complete right at the delivery deadline. System 100 may schedule transmission of DCC 102 early, for example, at times when the cinema IT system 120 and/or data communication links 150 are typically operating at low capacity such as from very early in the morning to midday.

Specific items of DCC 102 may be transferred earlier as long as the cinema IT system 120 has sufficient storage to receive and hold the specific item of DCC 102 through to the last scheduled showing of the specific item of DCC 102. In some embodiments scheduler 112 determines the available storage capacity for a cinema IT system 120 at times leading up to the latest start time that will deliver a specific item of DCC 102 by the corresponding delivery deadline (e.g. by processing schedule data 113) to assess whether an earlier start time can be scheduled.

Scheduler 112 may trigger transfer of DCC 102 to cinema IT systems 120 to begin at the corresponding scheduled start times. Scheduling data 113 may relate to scheduled transfers of DCC 102 to a cinema IT system 120 generally. In some embodiments transfers to specific parts of a cinema IT system 120 are scheduled separately (e.g. a cinema IT system 120 may have plural interfaces or servers for receiving transfers of DCC 102 and transfers of DCC 102 to these interfaces or servers may be scheduled separately taking into account factors specific to the interfaces or servers). Scheduler 112 may obtain information that may be relevant for scheduling from cinema IT system 120.

In some embodiments, system 100 schedules delivery of specific DCC 102 to a plurality of cinema IT systems 120 at the same time, for example using a multicast transmission. This approach may significantly reduce traffic on some of data links 150 internal to backbone 110 especially where the plurality of cinema IT systems 120 include cinema IT systems 120 that are located in the same general geographical area.

System 100 advantageously includes an ordering system 112A that operates in conjunction with scheduler 112. Ordering system 112A provides a platform by way of which operators of cinemas may place orders for cinema content from one or more distributors 105 to be played on certain screens in a cinema at specific screening times. Upon an order being accepted, ordering system 112A may update a schedule of screenings for the corresponding cinema as well as make information about the accepted order available to scheduler 112 (e.g. in schedule data 113) for scheduling.

System 100 may provide an interface 140 by which a cinema manager may view the schedule of screenings for a particular cinema. Interface 140 may provide information regarding the status of specific DCCs 102 required for scheduled screenings. The status may, for example indicate that the specific DCC 102 is on the appropriate cinema IT system 120 and verified intact or that transmission of the specific DCC 102 is in progress (and when it is expected to be complete) or that the specific DCC 102 is scheduled for transmission at a specific time.

Interface 140 may additionally indicate that any decryption keys needed to playback the DCCs 102 in the schedule have or have not been received and are present on the appropriate cinema IT system 120.

Interface 140 may additionally or alternatively mediate communications between one or more of cinema IT systems 120, distributors 103, backbone 110, and one or more components of cinema IT systems 120 (e.g. federated server groups 123 and/or servers 130 discussed elsewhere herein). Interface 140 may comprise private and/or public interfaces. Private interfaces may be accessible only by computer systems that are pre-authorized to interact with interface 140 (e.g. parts of system 100).

Interface 140 may comprise one or more private components and one or more public components. For example, the component(s) of interface 140 that face one or more distributors 103 and/or one or more cinema IT systems 120 may comprise a public interface. The component(s) of interface 140 that face backbone 110, one or more components of cinema IT systems 120 (e.g. federated server groups 123 and/or one or more servers 130 discussed elsewhere herein) may provide private interfaces. In some embodiments interface 140 is provided by backbone 110 as depicted by dashed line 141.

In some embodiments cinema IT systems include dedicated interfaces for communicating with interface 140. The interfaces may, for example comprise wireless (e.g. 5G) interfaces, software interfaces or the like. By way of such interfaces, users of cinema IT systems 120 may interact with interface 140.

In some embodiments interface 140 is operable to receive:
authorization from a distributor 105 to upload an item of DCC 102 from the corresponding distributor server 103 to backbone 110 so that the item of DCC 102 will be available for distribution to cinema IT systems 120; and
authorization to transfer a specific item of DCC 102 from backbone 110 to a particular cinema IT system 120. The authorization may specify specific screen(s) 124 on which the item of digital content 102 may be played back and may specify times when the item of digital content 102 may be played.

Interface 140 may be configured to transmit to distributors 105 requests from specific cinemas to rent specific DCC 102 (e.g. for display on certain screens at certain times or during a certain period). Each specific DCC 102 may have a unique identifier, for example a serial number. Interface 140 may relay to distributors 105 information about the scheduling of DCC 102 within a cinema IT system 120. For example, interface 140 may relay to distributors 105 information about one or more of DCC 102, servers, screens and show times. For example, information may include one or more of what DCC 102 is stored on what servers, what DCC 102 is played on what screens, the show times of DCC 102 and what DCC 102 cinema IT system 102 wants and/or has.

Interface 140 may relay information to backbone 110 the information may include scheduling data 113 for use by scheduler 112. Backbone 110 may store the scheduling data 113 for use by scheduler 112.

Interface 140 may, for example, comprise one or both of one or more application programming interfaces (APIs) and one or more web portals. For example authorized people may use a web portal to provide information to interface 140. For example automated general management system 125 may send commands to an API of interface 140. Multiple entries may be submitted at once regardless of whether interface 140 comprises one or both of API(s) and a web portal(s). This means for example, distributor associates 105 may enter all DCC 102 with the destination of each as one input. For example interface 140 may comprise an API between backbone 110 and cinema IT system 120. That API may include functions that may be invoked by software executing on cinema IT systems 120 to exchange commands and information with backbone 100.

In some embodiments, individual cinema IT systems 120 in system 100 include interfaces that provides the status of the cinema IT system 120, the DCC 102 stored on the cinema IT system 120, the screen(s) 124 of the cinema IT system 120 etc. Such interfaces may provide similar information for individual cinemas as the interface 140 described above without a centralized system.

Figure 2:
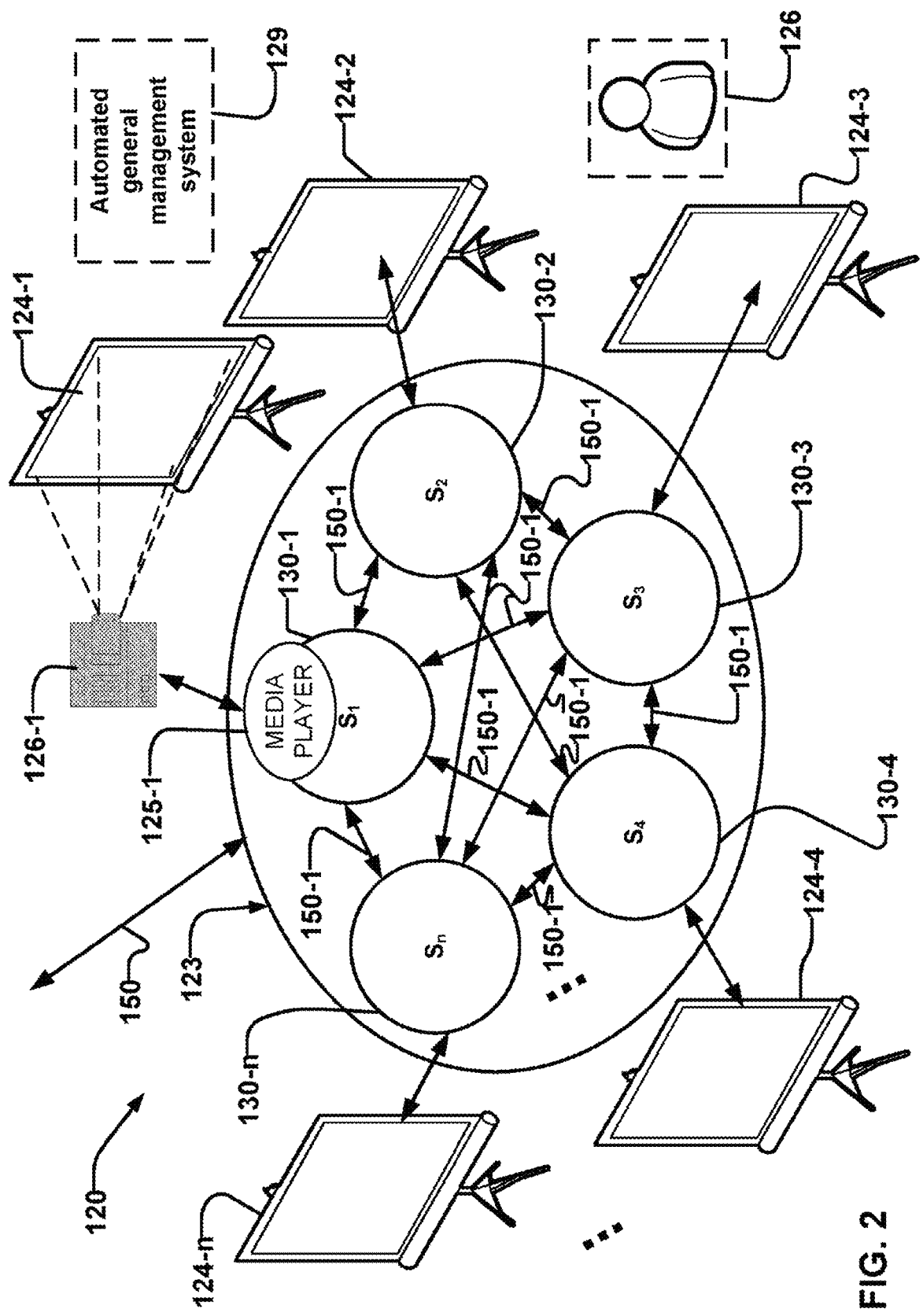
FIG. 2 is a schematic diagram depicting an IT system for an example cinema configured to work with the cinema management system of FIG. 1.

FIG. 2 is a schematic drawing illustrating an example cinema IT system 120. Cinema IT system 120 may, for example, be associated with one physical movie theatre location. The movie theater location may include multiple screens. For example, it is not uncommon for a single cinema location to have 5, 10 or more screens and for each of the screens to be playing different DCC 102 at any given time.

Cinema IT system 120 comprises one or more servers 130. In the embodiment depicted in FIG. 2 cinema IT system 120 includes servers 130-1, 130-2, 130-3, 130-4 . . . 130-$n$, (generally or collectively servers 130).

Cinema IT system 120 further comprises one or more screens 124 where DCC 102 is played. The embodiment depicted in FIG. 2 includes screens 124-1, 124-2, 124-3, 124-4 . . . 124-$n$ representing that there may be any number of screens 124, (generally or collectively screens 124). Screens 124 may comprise any type of screens for displaying DCC including screens on which images are projected by a projector (front or rear projection) self-illuminating screens such as LED screens etc. Screens 124 may be in a theatre setting and/or a lobby setting.

For each screen 124, cinema IT system 120 includes a media player 125 which is connected to control a playback system 126. Playback system 126 may comprise a sound system to reproduce audio for DCC 102. To avoid clutter, FIG. 2 only shows media player 125-1 and playback system 126-1 which correspond to screen 124-1 and omits media players and playback systems for other screens 124.

In some embodiments each media player 125 is hosted on a server 130 that is associated with a particular one of screens 124. In the embodiment depicted in FIG. 2 each screen 124 is associated with one corresponding server 130 and no screens 124 share a server 130. In FIG. 2, screen 124-1 is associated with server 130-1, screen 124-2 is associated with server 130-2, screen 124-3 is associated with server 130-3, screen 124-4 is associated with server 130-4 and screen 124-$n$ is associated with server 130-$n$. In other embodiments one server 130 may be associated with a plurality of screens 124 and/or one screen 124 may be associated with plural servers 130.

Typically, a cinema licenses individual items of DCC 102 from a distributor 105 to be played on one or more specific screens 124. To facilitate this, each item of DCC 102 may be digitally encrypted in a way that only allows playback by the specific media player 125 associated with the specific screen 124 for which the playback has been licensed. For example, each media player 125 may comprise a decryption engine that uses a unique private key of a unique public/private key pair. DCC 102 licensed for playback by that media player 125 may be encrypted. To enable a specific media player 125 to playback the digital media content 102 distributor 105 may provide a Key Delivery Message (KDM) which contains a decryption key for the DCC 102 that has itself been encoded using the public key of the media player 125. Media players 125 may be constructed to use their private key to obtain the decryption key so that the DCC 102 can be played back. Media players 125 may be constructed such that their private keys are not externally available (e.g. the private keys may be stored in a secure hardware device) and so that the decryption key for the DCC 102 is unavailable outside of the media player 125.

System 100 may facilitate or automate the generation of KDMs. For example, system 100 may store public keys for each of media players 125 (e.g. in backbone 110). When a cinema manager places an order for a particular DCC 102 to be played on a specific screen 124 using an ordering interface of system 100, the corresponding public key may be transmitted to the appropriate distributor server 103. The distributor server 103 may be configured to request a KDM from distributor 105 or to automatically generate the KDM from the received public key and the decryption key for the specific DCC 102. Generation of the KDM may be performed by secure hardware.

KDMs may be transmitted to the corresponding cinema IT systems 120 by way of system 100. System 100 may track the delivery of KDMs and may generate a warning if a KDM has not been received for each of the screen(s) 124 for which playback has been licensed.

In some embodiments system 100 is configured to deliver specific DCC 102 that has been licensed for playback on a specific screen 124 to a data storage location in a cinema IT system from which the DCC 102 may be played back on the specific screen 124 without transferring the DCC 102 within the cinema IT system. For example, system 100 may transfer a DCC 102 for playback on a screen 124 directly into a data store of a server 130 that corresponds to the screen 124. This functionality may be applied to allow distributors to assign DCCs 102 to be directly delivered from outside of a cinema IT system 120 to a server or servers within the cinema IT system from which the DCC 102 may be played back on the desired screen 124. In some embodiments the specific screen 124 for which the DCC is destined may be specified in schedule data 113. In some embodiments system 100 includes an interface by way of which distributors can specify one or more screens 124 in one or more specific cinemas to which system 100 should transfer a DCC 102 for playback. In some embodiments, each screen 124 in system 100 has a unique ID that may be used to route DCCs for playback on the screen 124. In some embodiments system 100 stores the unique IDs for all screens 124 in system 100.

In some embodiments system 100 is configured to transmit KDMs for playing back the DCC 102 on the specific screen(s) 124 in the specific cinema(s). System 100 may deliver the KDMs directly into appropriate storage locations in the applicable cinema IT systems 120.

In some embodiments, transfer of DCCs to a cinema IT system 120 is regulated based on a current load being experienced by the cinema IT system 120 and/or current traffic levels on data links through which the DCCs 102 are being delivered to the cinema IT system 120. For example, the data transfer rate for a DCC 102 may be reduced or the transfer may be paused where the cinema IT system 120 is operating at a high load and/or has limited bandwidth to receive and store the incoming DCC 102. The cinema IT system 120 may be configured to deliver to backbone 110 information regarding the current load and/or available bandwidth in the cinema IT system 120 to facilitate such regulation.

In some embodiments, data storage of servers 130 of a cinema IT system 120 is shared such that a media player 125 is not limited to playing back only items of DCC 102 that are stored on the same server 130 that hosts the media player 125. In some such embodiments system 100 transfers DCCs 102 directly from backbone 110 into available locations for data storage in the cinema IT system 120. This construction may reduce or eliminate the time-consuming transfer of items of DCC 102 within the cinema IT system 120.

A media player 125 hosted on one server 130 may play back DCC 102 that is stored in a data store of the one server 130 and/or one or more other ones of servers 130. A DCC 102 stored in cinema IT system 120 may be available for playback on any screen(s) 124 of the cinema IT system 120 without any need to transfer the DCC 102 within the cinema IT system 120 prior to playback. For example, in some embodiments some or all servers 130 of a cinema IT system 120 are configured as a federated server group ("FSG") 123.

In some embodiments to set up a FSG 123 a plurality of servers 130 are first powered on. Servers 130 are configured to connect to one or more other ones of servers 130. Additional servers 130 may be added to an established FSG 123. Servers 130 may be configured to automatically add themselves to an established federated server group when they are powered on. Once FSG 123 is established then the federated server group may establish connections to one or both of backbone 110 and interface 140. Establishing a connection with backbone 110 may occur before, at the same time or after establishing a connection with interface 140.

FSG 123 then proceeds to a standby state where FSG 123 waits for an event such as one or more of receiving DCC 102, adding/removing a server 130, the malfunctioning of a server 130, playing DCC 102 on a screen 124, an external information request and scheduled maintenance. FSG 123 may take action in response to such a response. The action may vary depending on the event.

Other servers outside of FSG 123 (e.g. servers of backbone 110), may interact with FSG 123 as if servers 130 were a single server. FSG 123 provides a defined interface for interacting with servers of backbone 110. In some embodiments of system 100 each FSG 123 may be visible to backbone 110 as a network-attached-storage ("NAS") device such that backbone 110 can directly write data such as DCC 102 to FSG 123 for storage.

Within cinema IT system 120 servers 130 may each share some or all of their data storage with other ones of servers 130 such that servers 130 collectively provide a shared data store that combines data stores of plural servers 130. In preferred embodiments, any media player 125 in cinema IT system 120 may access for playback DCC 102 stored in the combined data store of the FSG 123 no matter which server(s) 130 actually host the stored DCC 102. This arrangement can provide a 1:1 relationship of media players 125 to screens 124 such that each media player 125 is provided on a dedicated server 130 while removing the requirement that the DCC 102 to be played back on a particular media player 125 must be stored on the same server 130 as the media player 125.

DCC 102 may be stored virtually anywhere in cinema IT system 120 while remaining accessible as if the DCC 102 were stored on the server 130 that hosts the media player 125.

When backbone 110 transfers DCC 102 to one or more cinema IT systems 120 backbone 110 may deliver DCC 102 to one or more specific servers 130 or to a FSG 123 comprising plural servers 130 (in which case the DCC 102 may be stored on one server 130 or distributed among data stores of plural servers 130 depending on the configuration of the FSG 123).

In some embodiments, cinema IT system 120 has one or more additional servers 130 that are not associated with one or more screens 124 and are not used to playback DCC 102. Such additional servers may store DCC 102. Providing such additional servers 130 advantageously allows cinema IT system 120 to have a ratio of servers 130 to screens 124 that is greater than 1:1. In some embodiments FSG 123 may be configured so that DCC being received from backbone 110 is directed to additional servers 130 when servers 130 associated with screens 124 are busy (e.g. playing back DCC).

In some embodiments, cinema IT system 120 may be configured to allow playback of one item of DCC 102 by a first media player 125 hosted by a first one of servers 130 at the same time as another item of DCC 102 that is stored in whole or in part on the first server 130 that hosts the first digital media player 125 is played back by a second media player hosted on a second one of servers 130. In such embodiments the data links 150 connecting servers 130 within the cinema IT system 120 must have high capacity and severs 130 must have sufficient I/O capacity to support simultaneous flows of data corresponding to different DCC 102 being played by different media players 125. To facilitate the simultaneous flows of data corresponding to different DCC 102 being played by different media players 125 the bandwidth available between different servers 130 may, for example be 10 Gbps or more.

Cinema IT system 120 may comprise an automated general management system 129. Automated general management system 129 may comprise software executing on one or more data processors of cinema IT system 120. General management system 129 may perform various functions. The functions of general management system 129 may, for example, including one or more of:

- interfacing with scheduler 112 and maintaining a local schedule of what DCC 102 is to be played on what screen 124 at what time,
- providing an interface to ordering system 112A for ordering DCC 102 for future showings. The interface may optionally provide functions for accessing upcoming releases of DCC 102, pre-ordering new releases, automatically scheduling pre-ordered new releases when their release dates become known,
- tracking received DCC 102 and corresponding KDMs (or other keys required to playback the DCC on specific screens),
- automatically deleting DCC 102 from cinema IT system 120 when that DCC 102 is no longer needed (e.g. all scheduled showings of that DCC 102 are completed),
- monitoring the performance of cinema IT system 120 as well as data link(s) 150 by way of which DCC 102 may be transferred to the cinema IT system 120 from backbone 110,
- generate scripts to send information, such as requests or schedules to parties external to cinema IT system 120.

Management of cinema IT systems 120 may be centered around the primary function of reliable and uninterrupted playback of DCC 102 on screens 124. Other functions such as receiving transfers of new DCCs 102 from backbone 110 and/or transferring data within cinema IT system 120 for purposes other than playback may be managed so that they do not interfere with playback of DCC 102. For example, the other functions may be:

- scheduled to occur at times when playback is not occurring; and/or
- controlled so that they do not consume processing or bandwidth resources required for uninterrupted reliable playback (e.g. by throttling data transfers, running processing at a reduced priority level or the like); and/or
- performed using parts of the cinema IT system that are not involved in (e.g. out of the path of) playback functions).

In some embodiments servers 130 of a cinema IT system 120 each include plural data interfaces and servers 130 are interconnected by plural data communication links. A first set of the interfaces and data links may be reserved for playback of DCCs 102 at lease while playback is occurring. A second separate set of interfaces and data links may be used for functions other than playback while playback is occurring.

Figure 3:
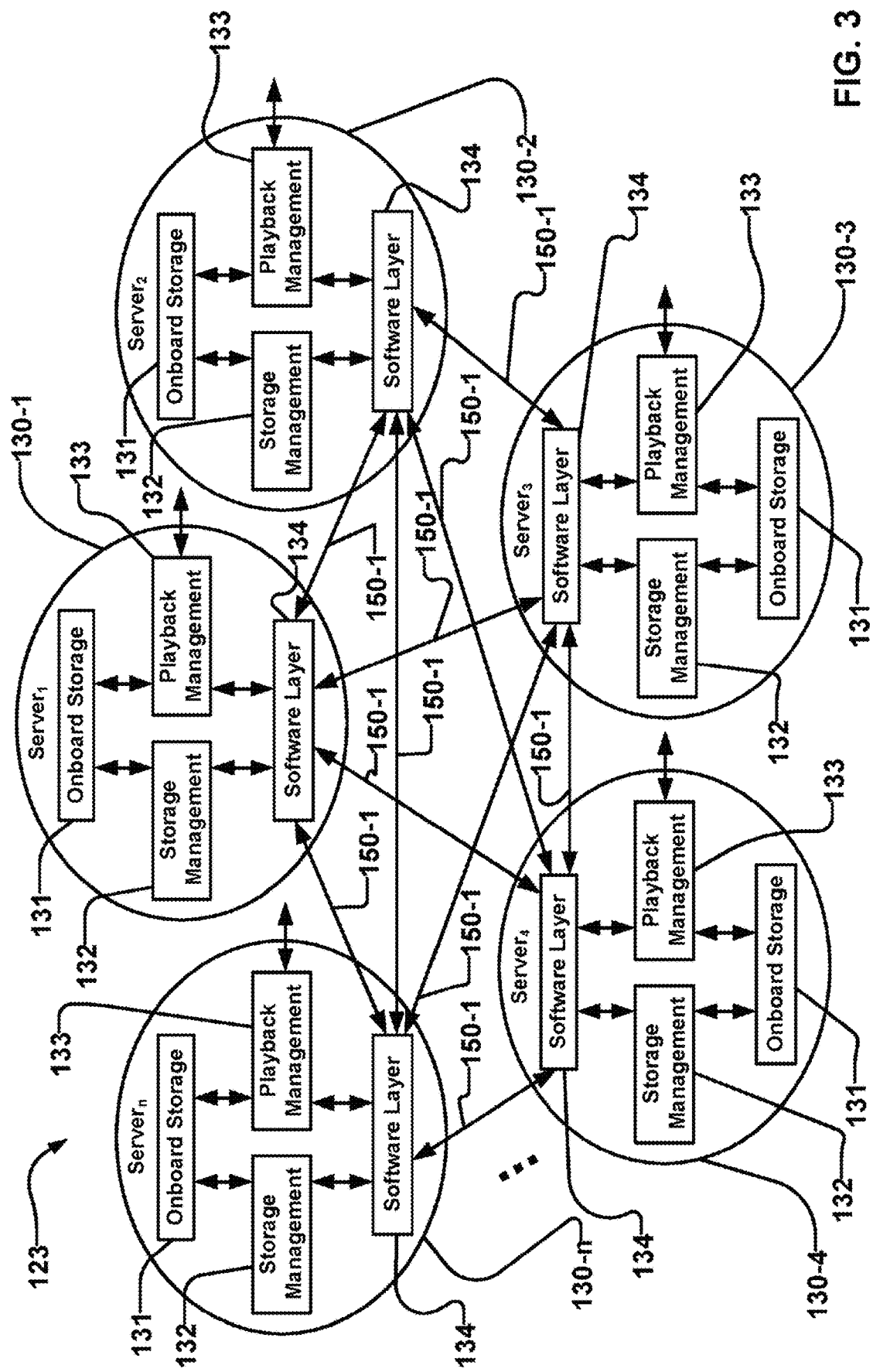
FIG. 3 is a schematic diagram depicting an example federated server group that may be included in the IT system of FIG. 2.

FIG. 3 schematically depicts an example FSG 123. In a typical implementation, the number of servers 130 in FSG 123 is based on the number of screens 124 served by media players 125 of the FSG 123. FSG 123 typically includes in the range of 2 to 20 servers 130. In some embodiments FSG 123 includes one server 130 for each screen 124 of a cinema served by the FSG 123. The aggregate storage available on all servers 130 within a FSG 123 is selected to be sufficient to hold currently running items of DCC 102 plus a buffer so that items of DCC 102 that are scheduled for an upcoming run may be received in advance. The servers 130 within a FSG 123 may, for example have aggregate data storage of 10 TB, 20 TB or more. Within a FSG 123 each server 130 that is associated with a screen 124 may comprise a media server 125 dedicated to playback on that screen 124.

Each server 130 comprises onboard data storage 131. Onboard data storage 131 may be applied to store DCC 102. Onboard data storage 131 may comprise one or more data storage modules. In some embodiments the data storage modules are dual ported such that the modules support simultaneous or nearly simultaneous reads and/or writes. Onboard storage 131 may, for example, comprise one or more M.2 modules. Onboard data storage 131 may include a high throughput data interface, for example, a Non-Volatile Memory Express interface which may provide data throughput up to 31.5 Gb/s.

Each server 130 includes high throughput communication interfaces which allow DCC 102 to be relatively rapidly transferred into the corresponding onboard data storage 131, received for playback from onboard data storage 131 of one or more other servers 130, received as a feed/stream (e.g. for streamed events) and/or delivered from the corresponding onboard data store 131 to medial servers of one or more other servers 130 for playback. The interfaces may be provisioned to support a bitrate that is high enough to support two or more simultaneous streams each having a bitrate sufficient for instant playback of an item of DCC 102. In some embodiments servers 130 of a cinema IT system 120 are connected by 10 Gigabit Ethernet data links. The combination of high throughput interfaces to onboard data stores 131 in servers 130 with fast interconnections between servers 130 may allow DCC 102 to be simultaneously streamed between different servers 130 within FSG 123.

Including cinema IT systems 120 that are operable to stream DCC 102 stored on one or more servers 130 to media players on other servers 130 may allow greater flexibility in how DCC 102 is stored within the cinema IT systems. This, in turn may reduce or eliminate:

- the need to store the same DCC 102 on multiple servers 130 in a cinema IT system 120;
- the need to transfer DCC 102 among data stores of servers 130 in a cinema IT system 120; and/or
- may allow the storage of FSG 123 to be optimized.

In some embodiments a network speed greater or equal to 10 Gbps may allow the transfer of DCC 102 between servers 130 at a bitrate greater than is required for playback.

In the illustrated embodiment, each server 130 also comprises storage management 132. Storage management 132 comprises software and/or hardware that operates to control operation of onboard data storage 131 as required for operation of cinema IT system 120 (e.g. in response to requests from general management system 129). Storage management 132 may, for example issue commands to onboard storage 131. Commands may include commands to do one or more of: store DCC 102, delete stored DCC 102, copy DCC 102, check completeness of DCC 102, read DCC 102, etc. Storage management 132 may receive such commands and then relay them to onboard storage 131.

In the illustrated embodiment, each server 130 also comprises playback management 133. In alternative embodiments, one or more servers 130 may not comprise playback management 133. Playback management 133 manages the playback of DCCs 102 on server 130. Playback management 133 includes software and/or hardware that is configured to help setup playback of DCC 102 on a media player 125. Playback management 133 may communicate with onboard storage 131 and/or one or more media players 125 which correspond to one or more screens 124 associated with server 130. Playback management 133 may receive commands (e.g. from general management system 129) to configure cinema IT system 120 to play specific DCC 102 on a specific screen 124 at a specific time.

Each server 130 comprises software layer 134 (generally or collectively software layers 134). Each software layer 134 comprises computer software that, when executed by the corresponding server 130 causes the server 130 to communicate with software layers 134 on one or more other servers 130. In FIG. 3 software layers 134 are each depicted as communicating with software layers 134 on all other servers 130 in federated server 123. In other implementations other connectivity between software layers 134 may be provided.

Servers 130 manage FSG 123 using software layers 134. Management of FSG 123 may be structured in various ways. For example in some embodiments, one of servers 130 or a selected subset of servers 130 may perform management functions for FSG 123. In other embodiments all of servers 130 may cooperate to manage the operation of FSG 123. Communications between servers 130 mediated by software layers 134 coordinate the actions of servers 130 in FSG 123. FSG 123 In some embodiments where fewer than all servers 130 are engaged in managing FSG 123 at any given time, at least one software layer 134 running on a first server 130 that manages FSG 123 may have one or more designated backup software layers 134 running on other ones of server(s) 130 that serve as designated backup servers for the first server 130. If the first server 130 fails or malfunctions one or more of the designated backup servers 130 may take over the management functions of the first server 130.

Redundancies may be configured on a FSG 123 basis (e.g. each FSG 123 may have its own unique redundancy parameters). Redundancies may include any or all of redundant data storage, redundant software and redundant management systems. Redundancies be selected by system 100, cinema IT system 120, and/or by cinemas. In some embodiments redundancies include plural data stores configured in a Redundant Array of Independent Disks ("RAID") architecture. Software layers 134 may self-select which one or more software layers will manage FSG 123.

In some embodiments, management of FSG 123 may involve a majority rule system. For example, a server 130 that is configured to take part in managing FSG 123 may initiate a proposed decision and may relay the proposed decision to one or more other managing servers 130. The receiving managing servers 130 may acknowledge the proposed decision by responding to the initiating managing server 130. The receiving managing servers 130 may relay the proposed decision to one or more other managing servers 130. Once a predefined number of the receiving managing servers 130 has acknowledged the proposed decision the initiating managing server 130 may issue commands to one or more servers 130 to implement the proposed decision. Upon receipt of such commands the receiving server(s) 130 may implement the proposed decision by executing the commands.

One aspect of managing FSG 123 entails managing DCC 102 on servers 130. Managing DCC 102 may include one or more of determining what DCC 102 should be stored on what server(s) 130, what DCC 102 should be prioritized, what server(s) 130 should have a backup of DCC 102 and what if any DCC 102 may be deleted from storage. Managing DCC 102 may additionally or alternatively include keeping records of DCC 102 and/or instructing that DCC 102 should be played etc.

In some embodiments the one or more software layers 134 may be configured to split storage of all or certain DCC 102 among two or more different servers 130 participating in the shared data storage. For example a movie may comprise a video file, an audio file and a subtitle file. The one or more software layers 134 may decide to store the audio file on a first server 130, the video file on a second server 130 and the subtitle file on a third server 130. Alternatively or additionally the one or more software layers 134 may split for example the video file between a plurality of servers 130. Each DCC 102 may comprise an asset map that is an overview of the components that make up the whole of such DCC 102 (e.g. one or more different video components, audio components, subtitle components, etc.). The asset map or components of the asset map may be hashed to check for the completeness of such DCC 102. In some embodiments as more DCC 102 are stored on servers 130 participating in the shared data store, software layer(s) 134 are configured to select locations to store DCC 102 so that DCC 102 are balanced among the data stores provided in the cinema IT system 120.

In some embodiments software layers 134 are configured to store one or more backups of DCC 102 (or split components of DCC 102) on one or more servers 130. In storing one or more backups software layers 134 may consider one or more of upcoming show times of DCC 102, storage availability of servers 130, activity (e.g. playback) on servers 130 and preferences of system 100, cinema IT system 120 and/or the cinema. For example, show times may be considered to provide more redundancy for DCC 102 that have closer approaching show times than other DCC 102.

In managing the storage of DCC 102 software layer(s) 134 may be configured to optimize how servers 130 store DCC 102. Factors such as one or more of what screen(s) 124 is DCC 102 scheduled to be played on, at what time(s) DCC 102 will be played, the processing load of individual servers 130 and/or the processing load of FSG 123 may be considered in optimizing storage. For example, storage may be considered to be optimized when DCC is copied to server 130 associated with playback at some point prior to playback. For example, storage may be considered to be optimized if DCC 102 is stored on a server 130 that has low activity in relation to one or more other servers 130 when DCC 102 is stored and/or when DCC 102 is to be played.

Software layer(s) 134 may determine that it is appropriate or necessary to delete certain DCC 102 from servers 130. For example software layer(s) 134 may periodically compare DCC 102 stored on servers 130 to a schedule and determine whether the schedule includes active show times related to the DCC 102. If there are no active show times software layer(s) 134 may determine such DCC 102 should be deleted. For example software layer(s) 134 may periodically compare DCC 102 stored on servers 130 with available keys. If there is no valid key or the key has expired for a particular DCC 102 software layer(s) 134 may determine such DCC 102 should be deleted and may cause the DCC 102 to be deleted.

Software layer(s) 134 may prioritize DCC 102 storage. For prioritization of content software layer(s) 134 may consider one or more of:

show times (i.e. when DCC 102 is to be played and on what screen(s) 124);
data type (e.g. video, audio, subtitles, etc.);
status of server(s) 130 (e.g. CPU load, storage module availability, etc.);
FSG 123 status (e.g., total network capacity, load, etc.);
user preferences (e.g. cost preferences, redundancy preferences, performance preferences).

For example DCC 102 with current show times may be prioritized to be stored on a server 130 associated with a screen 124 where such content 102 will be played compared to content 102 that only has future show times. For example the storage of video and/or audio data may be prioritized to be stored on a server 130 associated with a screen 124 where such content 102 will be played compared to subtitle data. For example, when transferring two DCC 102 between servers 130 the DCC 102 that has an earlier show time may be transferred before the DCC 102 with a later show time.

Software layer(s) 134 may also manage playback of DCC 102 on screens 124. Playback management may be performed by a software layer 134 on a server 130 that is associated with the screen 124 where specific DCC 102 is to be played. To play DCC 102 software layer(s) 134 may determine on what server(s) 130 such DCC 102 is stored. Software layer(s) 134 may query one or more servers 130 to ask whether a server 130 has any portion of DCC 102. Software layer(s) 134 may request that any servers 130 that have any portion of such DCC 102 will send the portion of such DCC 102 to a media player 125 of a specified server 130. The specified server 130 may be a server 130 that is associated with the screen 124 where such DCC 102 is to be played. Where an item of DCC 102 is split between a plurality of servers 130 the specified server 130 may put together the portions of DCC 102 received from one or more servers 130. The specified server 130 may put DCC 102 together while it continues to receive such DCC 102 (e.g. such DCC 102 may be streamed) or after all parts of the DCC 102 have been received at the specified server 130. Software layer 134 on the specified server 130 may put together such DCC 102. Software layer 134 may select specific components of the DCC 102 (specific audio, specific video, specific subtitles etc.) for playback by the media player 125 based on an asset map for the DCC 102, capabilities of the media player 125, and/or a language selection for playback of the DCC 102.

Throttling may be applied within IT cinema system 120 while transferring DCC 102 among servers 130. For example, the data rate for transfers of components of the DCC 102 may be limited to a rate that is sufficient for uninterrupted playback of the DCC 102 by a media player 125 on which the DCC will be played back. For example the DCC transfer speed may be throttled to match the playback speed. Throttling the rate of transfers of data for DCCs 102 in cinema IT system 120 can leave more available bandwidth for other operations on cinema IT system 102 (such as playback of other DCCs 102 on other media players 125, receiving transfers of new DCCs 102 from backbone 110, receiving streamed DCCs 102 etc.).

Software layer 134 may instruct playback management 133 to play a particular DCC 102 on a particular screen 124 according to schedule data associated with the DCC 102. Playback management 133 may then play DCC 102 on screen 124.

Software layer(s) 134 may keep statistics about DCC 102. For example software layer(s) 134 may keep statistics about one or more of how many times each specific item of DCC 102 was played within cinema IT system 120, how many times specific DCC 102 was played on what screens 124, what screens 124 on which specific DCC 102 was played, how many tickets were sold, etc. Such statistics may be compiled by cinema IT system 120 as records on which the amount of payment for renting individual items of DCC 102 may be calculated.

Software layers 134 may function as a "control center" for their specific servers 130. In this respect software layers 134 may determine the actions server 130 will take and then execute such actions. Software layers 134 may for example, cause actions to be executed by providing instructions to one or both of the corresponding storage management 132 and playback management 133. Communication with storage management 132 may comprise commands regarding the maintenance of onboard storage 131. For example commands may include adding DCC 102 to onboard storage 131, removing DCC 102 from onboard storage 131, checking the completeness of DCC 102 on onboard storage 131, reading DCC 102 from onboard storage 131, checking what storage is used or available on onboard storage 131, etc. Communication with playback management 133 may include commands to play DCC 102. When deciding what actions server 130 should execute, software layer 134 may take into consideration the processing limits experienced by server 130. Software layer 134 may monitor server 130 to determine the processing limits of server 130.

Software layer(s) 134 may collectively function as a "control center" for FSG 123. In this respect software layer(s) 134 may provide one or more interfaces which mediate interactions between FSG 123 and external parties. Software layer(s) 134 may send and/or receive DCC 102. Software layer(s) 134 may schedule delivery of DCC 102 and/or acknowledge delivery of DCC 102. In regards to delivery of DCC 102 software layer(s) 134 may further monitor one or more of the speed of delivery, completeness of delivery and estimated finish of delivery. Aspects of managing FSG 123, including the distribution of DCC 102 through FSG 123 may be abstracted from the local management of a server 130.

Another aspect of managing FSG 123 involves supervising servers 130. Software layer(s) 134 may:
 add a server 130 to FSG 123;
 remove a server 130 from FSG 123;
 monitor servers 130 to determine whether each server 130 is live or not;
 restart a server 130;
 power on or off a server 130;
 etc.

If during monitoring servers 130 it is determined that a server 130 is not live or is malfunctioning, software layer(s) 134 may be configured to take corrective action. For example software layer(s) 134 may attempt to restart such server 130, deem such server 130 to be removed from FSG 123, replace such server 130 with another server 130 and/or notify human representatives 126. Alternatively or additionally, software layer(s) 134 may take no corrective actions and instead continue sending queries to which server 130 may respond once working again. In cases where a server 130 is malfunctioning such server 130 may notify one or more other servers 130 of its malfunctioning status. If a server 130 is added and/or removed from FSG 123 software layer(s) 134 may determine a new storage plan for DCC 102 and redistribute DCC 102 already stored on servers 130 as necessary.

In some embodiments one or more of cinema IT systems 120, FSG 123 and one or more servers 130 is configured to provide interface 140 with information about FSG 123 and/or servers 130. Such information may include one or more of what server(s) 130 are operating, what screen(s) 124 are associated with what server 130, preferred show times, preferred screens 124 for certain DCC 102, preferred DCC 102, processing capacity of servers 130, transfer capacity for servers 130, etc. Interface 140 may relay such information to one or both of distributor servers 103 and backbone 110. Distributors 105 may use such information to determine what DCC 102 to schedule for delivery to cinema IT system 120. Backbone 110 may store such information within scheduling data 113. Scheduler 112 may use such information to determine a transfer rate for certain DCC 102. Backbone 110 may additionally or alternatively relay such information and/or request such DCC 102 from distributors 105. In some embodiments interface 140 may request one or more of cinema IT system 120, FSG 123 and one or more servers 130 to provide information about FSG 123 and/or servers 130.

Data connections 150 facilitate exchange of DCC 102, associated keys and control information within cinema management system 100. Data connections 150 may connect:
 one or more of interfaces 140, backbone 110, distributor servers 103, cinema IT systems 120 with one or more of each other;
 one or more federated server groups 123 with one or more of interface 140, backbone 120 and distributor servers 103; and
 each server 130 with one or more other servers 130 within FSG 123.

Data links 150 may be arranged to provide a singular network by way of which all components of system 100 are connected. For example a single network where interface 140 is connected to distributor servers 103, cinema IT system 120, backbone 110 and FSG 123, backbone 120 is connected to distributor servers 103, cinema IT systems 120 and federated server groups 123 plus each server 130 is connected to one or more other servers 130 within FSG 123.

In some embodiments, data links 150 are configured to provide a plurality of sub-networks through which components are connected. This is illustrated for example in FIGS. 1 through 3 in which:
 one or more servers 130 within a FSG 123 are connected via a sub-network of data links 150-1.

federated server groups 123 are connected to backbone 110 via a sub-network of data links 150-2 and/or to interface 140 via sub-network 150-3.

backbone 110 is connected to interface 140 via a sub-network of data links 150-4.

backbone 110 is connected to distributors 103 via a sub-network of data links 150-5.

distributors 103 are connected to interface 140 via a sub-network of data links 150-6.

Backbone 110 is connected to content creators 104 via a sub-network of data links 150-7.

In some embodiments data links of one or more sub-networks are provided by a 5G wireless network.

Data links 150 may comprise one or both of optical or wired electrical or wireless connections. Wireless connections may include Wi-Fi, cellular, etc. In some embodiments some or all of network 150 may comprise a 5G network. For example in some embodiments network 150 may be made up of wired connections and 5G connections. A 5G connection may advantageously reduce latency and/or provide a higher bandwidth and/or data capacity. One or more servers 130 may comprise an integrated 5G interface module. Such 5G interface module may allow connection to interface 140 by way of which management on a per screen 124 and/or per server 130 basis can occur.

Backbone 110 may establish a network connection with one or more servers 130 within a FSG 123. Backbone 110 may establish a network connection with the one or more servers 130 associated with the software layer(s) 134 managing FSG 123. Such network connection may be established via a network switch. Backbone 110 may communicate with FSG 123 via such network connection(s). Delivery of DCC 102 may occur through such network connection. DCC 102 may be delivered using a suitable protocol e.g. a File Transfer Protocol (FTP). Backbone 110 may deliver DCC 102 through a network connection to a server 130 associated with a screen 124 where delivery DCC 102 may be played. Backbone 110 may deliver DCC 102 through a network connection to a server 130 that is not associated with a screen 124 where content may be played. This may happen for example if a network connection between backbone 110 and a server 130 associated with a screen 124 where DCC 102 may be played is not available and/or for scheduling purposes. Backbone 110 may deliver DCC 102 through a network connection to a server 130 which FSG 123 has designated to store a copy of such DCC 102. After delivery DCC 102 may be redistributed to one or more other servers 130.

An option for delivering items of DCC 102 to cinema IT systems 120 is to configure system 100 such that backbone 110 provides DCC 102 to cinema IT systems 120 by way of interface 140. Interface 140 may then transfer copies of the DCC 102 to the appropriate cinema IT system(s) 120, FSG 123 and/or server 130. In other embodiments, backbone 110 may directly deliver DCC 102 to cinema IT system 120, FSG 123 and/or server 130.

An option for delivering items of DCC 102 that are streamed (e.g. streamed live music concerts, streamed live sports events, etc.) is to configure system 100 such that content creators 104 provide DCC 102 to cinema IT systems 120 directly. In such embodiments there may be one or more data links 150 connecting content creators 104 to cinema IT systems 120. Such an option may be advantageous to reduce latency between the live streamed event and broadcast within cinema IT systems 120 that may be caused by relaying DCC 102 to cinema IT systems 120 through backbone 110.

Cinema management system 100 may be configured to operate in a way that reduces the likelihood that playback of digital cinema DCC 102 on screens 124 will be interrupted. For example DCC 102 may be transferred to cinema IT systems at times when playback is not occurring. This may be based on specific media players playing DCC 102 or generally for FSG 123. For example software layers 134 may manage content, servers, etc. when playback is not occurring on any media players in a cinema IT system 120. As another example, servers 130 actively engaged in delivering DCC 102 for playback or in playing back DCC 102 may be excluded from operations such as transferring DCC 102 from backbone 110 into a cinema IT system 120. Any changes to the configuration of such servers 130 may be delated until the servers 130 are no longer engaged in active playback of DCC 102.

Cinema management system 100 may be readily scaleable to serve larger numbers of cinemas, distributors and/or content creators and to provide more items of digital cinema content.

Figure 4:
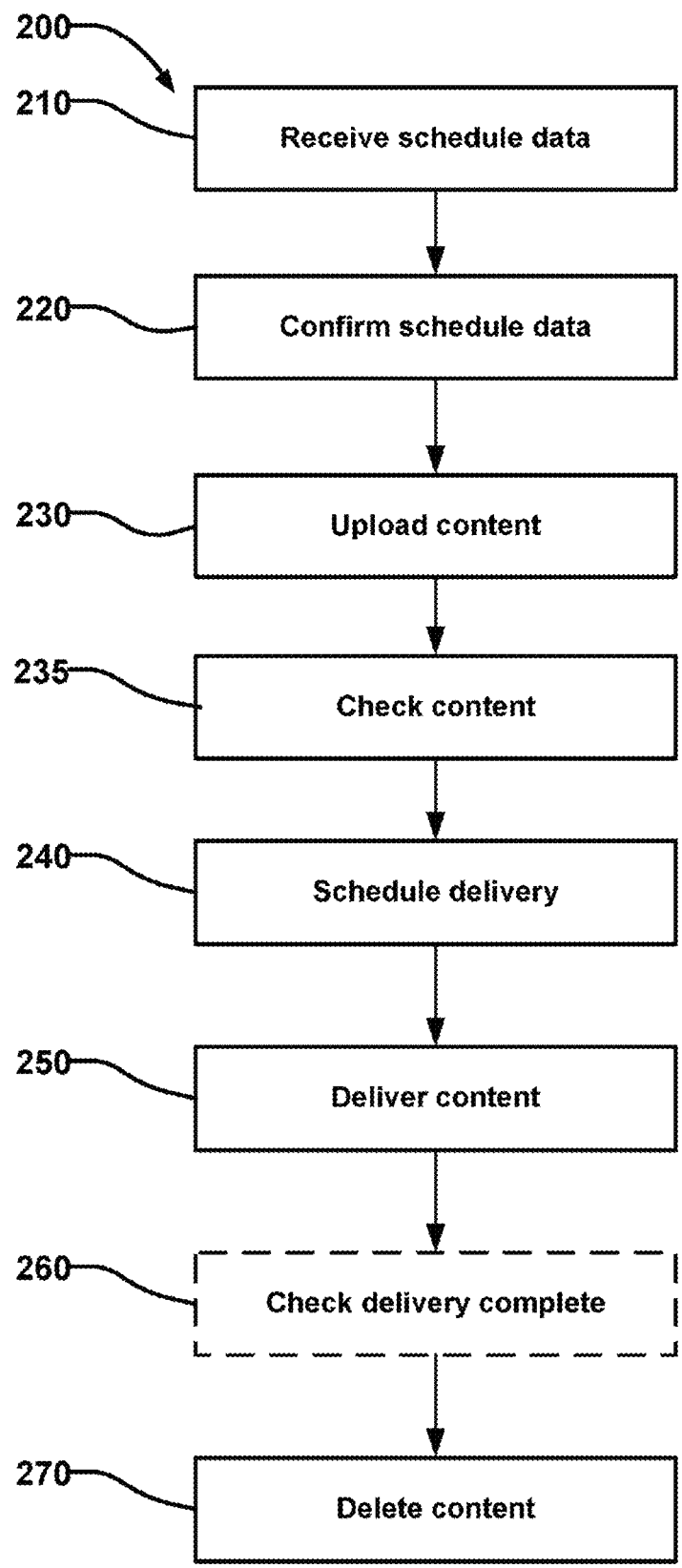
FIG. 4 is a block diagram depicting an example method for delivering digital cinema content.

FIG. 4 is a block diagram illustrating an example method 200 that may be applied in operation of backbone 110. Method 200 receives schedule data at block 210. In block 210 backbone 110 may receive scheduling data 113 as described elsewhere herein. In block 220 backbone 110 confirms the scheduling data 113 with the sending party. Upon completion of block 220 DCC 102 is uploaded to backbone 110 in block 230. Completeness and integrity of uploaded DCC 102 may be checked (e.g. via a hash check) in block 235. In bock 240 backbone 110 schedules delivery of DCC 102 to one or more cinema IT systems 120. DCC 102 may be scheduled for delivery as described elsewhere herein.

FIG. 4 depicts upload content block 230 as occurring prior to schedule delivery block 240. However, blocks 230 and 240 can be performed in any order and may be performed concurrently. After blocks 230 and 240 are performed, backbone 110 delivers DCC 102 to one or more cinema IT systems in block 250. After DCC 102 has been delivered to all cinema IT systems for which that DCC 102 is scheduled then backbone 110 may delete the DCC 102 in block 270. Prior to deleting content block 270 backbone 110 may check that DCC 102 was delivered in block 260.

System 100 is optionally configured to facilitate management of chains of cinemas. For example system 100 may include an ordering system that facilitates ordering DCC 102 for multiple screens in multiple cinemas of a cinema chain in a single order and a scheduling system 112 configured to deliver DCC 102 to the multiple cinemas (optionally together with KDMs to allow the DCC 102 to be played back on the multiple screens). System 100 may thereby facilitate management of content and keys per-site and per-screen but also across sites (per-chain or per-company).

Interpretation of Terms

Unless the context clearly requires otherwise, throughout the description and the claims:
  "screen" is not limited to any particular technology and includes any technology or combination of technologies that may be used for reproducing DCC for enjoyment by members of an audience.
  "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for distributing and managing digital cinema content (DCC), the method comprising:
at a content delivery backbone, receiving an item of DCC and storing the item of DCC in one or more backbone data stores;
accessing data comprising a scheduled show time for the item of DCC by each of one or more cinema IT systems and determining a delivery deadline for delivering the item of DCC to each of the one or more cinema IT systems based at least in part on the respective scheduled show time for the item of DCC by the cinema IT system;
determining an estimated transmission time to transfer a copy of the item of DCC from the backbone data store to each of the one or more cinema IT systems; and
for each of the one or more cinema IT systems:
determining a respective start time for the transfer of the copy of the item of DCC to the cinema IT system that is earlier than the delivery deadline by at least the estimated amount of time; and
at the respective start time commencing transferring the copy of the item of DCC to the cinema IT system.

2. The method according to claim 1, wherein, for at least one of the cinema IT systems, transferring the copy of the item of DCC to the cinema IT system comprises transferring the copy of the item of DCC to a network attached storage (NAS) interface associated with the respective cinema IT system, or
wherein, for at least one of the cinema IT systems, estimating an amount of time required to transfer a copy of the item of DCC from the backbone data store to the cinema IT system is based at least in part on estimates of future traffic levels in data connections between the backbone and the cinema IT system generated by a predictive model based on historical data traffic measurements in the data connections between the backbone and the cinema IT system.

3. The method according to claim 1, wherein each of the cinema IT systems comprises one or more media player, each of the one or more media player is associated with a corresponding screen and each of the one or more media player has a public key wherein the method includes:
for each of the cinema IT systems automatically generating for the item of digital content at least one Key Delivery Message (KDM) which contains a decryption key for the copy of the item of digital content that has itself been encoded using the public key of a media player of the one or more media player for the cinema IT system.

4. The method according to claim 3, comprising:
accessing a data store containing records of orders for showings of items of digital cinema on the screens associated with media players of the one or more cinema IT systems; and,
for each of the one or more cinema IT systems identifying records of orders corresponding to showings of the item of digital content on each of a plurality of the screens associated with the media players of the cinema IT system;
wherein, for each of the cinema IT systems the at least one KDM comprises a plurality of KDMs for the item of digital content, each of the plurality of KDMs encoded using the public key associated with one of the media players that is associated with a respective one of the plurality of screens.

5. The method according to claim 1, wherein determining the respective start time is based on one or more of: a size of the item of DCC; where the item of DCC is stored in the backbone; bandwidths of data connections between where the item of DCC is stored in the background and the cinema IT system; expected traffic on the data connections between where the item of DCC is stored in the background and the cinema IT system; and availability of data storage on the cinema IT system.

6. The method according to claim 1, wherein determining the estimated transmission time for the item of DCC is based on the size of the item of DCC, the location from which the item of DCC will be transferred to the cinema IT system, a bandwidth of connections by which the copy of the item of DCC will be transmitted, and estimated traffic on the connections.

7. The method according to claim 1, wherein determining the estimated transmission time for the item of DCC takes into account an effect on the estimated transmission time of other items of DCC being transferred by the backbone.

8. The method according to claim 1, wherein the method comprises throttling a transfer rate for the item of DCC to at least one of the cinema IT systems, wherein the throttling is performed in response to determining that at least one item of streamed DCC is being streamed to the at least one of the cinema IT systems.

9. The method according to claim 1, comprising setting the respective start times to be times when the respective cinema IT system and/or data communication links connecting to the respective cinema IT system are expected to be operating at low capacity.

10. The method according to claim 9, wherein setting the respective start times comprises setting the respective start times to occur after midnight and before noon local time of the respective cinema IT system.

11. The method according to claim 1, wherein determining the start time for a respective one of the cinema IT systems comprises determining available storage capacity for the respective one of the cinema IT systems at times leading up to the latest start time that will deliver the item of DCC by the corresponding delivery deadline and setting the start time to be earlier than the latest start time if the available storage capacity of the respective cinema IT system will accommodate the earlier start time.

12. The method according to claim 1, wherein:
the one or more cinema IT systems comprises a plurality of cinema IT systems; and
the method comprises delivering the item of DCC simultaneously to the plurality of cinema IT systems.

13. The method according to claim 1, comprising providing an interface that communicates information regarding scheduled screenings of the item of DCC for a cinema IT system along with status information regarding the status of specific items of DCC required for the scheduled screenings wherein the status information includes at least information indicating that specific items of DCC have been received and verified at the cinema IT system and information indicating that other specific items of DCC have not yet been received by the cinema IT system.

14. The method according to claim 1, comprising receiving upload authorization to upload an item of DCC from a server associated with a distributor to the backbone and uploading the item of DCC in response to the upload authorization.

15. The method according to claim 1, comprising receiving distribution authorization to transfer the item of DCC from the backbone to one or more of the one or more cinema IT systems,
wherein the distribution authorization specifies one or more specific screen(s) on which the item of DCC is authorized to be played, or
wherein the distribution authorization specifies times when the item of digital content may be played.

16. The method according to claim 1, wherein transferring the copy of the item of DCC to the cinema IT system comprises delivering the copy of the item of DCC to a data storage location in the cinema IT system from which the copy of the item of DCC may be played on a specific screen for which playing of the item of DCC is authorized without further transferring the copy of the item of DCC within the cinema IT system.

17. The method according to claim 1, comprising regulating a rate of transfer of the copy of the DCC to the cinema IT system based on a current load being experienced by the cinema IT system, or
comprising regulating a rate of transfer of the copy of the DCC to the cinema IT system based on current traffic levels on data connections through which the copy of the DCC is being delivered to the cinema IT system.

18. A system for distributing and managing digital cinema content (DCC), the system comprising:
one or more cinema IT systems each of the one or more cinema IT systems associated with a cinema and comprising a plurality of cinema servers each of the cinema servers comprising a data store and one or more of the cinema servers comprising a media player associated with a corresponding screen;
a backbone configured to selectively deliver the DCC to one or more of the cinema IT systems, the backbone comprising:
one or more backbone data stores configured to receive and store the DCC; and
a scheduler configured to initiate transfer of copies of the DCC from the backbone to individual ones of the cinema IT systems, the scheduler configured to:
determine a delivery deadline for delivering an item of the DCC to one of the cinema IT systems based at least in part on a scheduled show time for the item of digital content by the cinema IT system;
estimate an estimated amount of time required to transfer the copy of the DCC from the backbone data store to the cinema IT system; and
determine a start time for the transfer that is earlier than the delivery deadline by at least the estimated amount of time.

19. The system according to claim 18, wherein in one of more of the cinema IT systems the cinema servers are associated to form a federated server group, the federated server group providing each of the media players of the cinema IT system with access to DCC partially or wholly stored in the data store of any of the cinema servers in the federated server group.

20. The system according to claim 19, wherein within the federated server group one or more of the cinema servers manages the federated server group, wherein management comprises one or more of determining where and how to store DCC, receiving DCC without disrupting playback, adding cinema servers to the federated server group and removing cinema servers from the federated server group, and/or
wherein the federated server group is configured to throttle the rate at which DCC is transferred to, from or within the federated server group, and/or
wherein the federated server group shares one or both of processing capacity and the transfer capacity of one or more cinema servers with the system, and/or
wherein the federated server group provides a network attached storage (NAS) interface for receiving the transferred DCC from the backbone.

21. The system according to claim 19, wherein the system comprises a predictive model based on historical data traffic measurements in data connections between the backbone and the cinema IT systems and the scheduler applies the predictive model to predict future traffic levels on the data connections and to estimate the estimated amount of time required to transfer the copy of the DCC from the backbone data store to the cinema IT system.

22. The system according to claim 18, comprising an ordering interface that aggregates information about items of DCC available from the distributor servers and receives orders for delivering selections of the available items of DCC to the cinema IT systems,
wherein the orders request permission to playback the ordered items of DCC on specific ones of the screens associated with one of the cinema IT systems, the media players associated with the screens each has a public key, and the system is configured to automatically generate for each of the ordered items of DCC at least one Key Delivery Message (KDM) which contains a decryption key for the ordered item of DCC that has itself been encoded using the public key of the corresponding media player.

23. A system for distributing and managing DCC, the system comprising:
one or more cinema IT systems each of the one or more cinema IT systems associated with a cinema and comprising a plurality of cinema servers each of the plurality of cinema servers comprising a data store and a media player associated with a corresponding screen of the cinema;
a backbone configured to selectively deliver the DCC to one or more of the cinema IT systems, the backbone comprising:
one or more backbone data stores configured to receive and store the DCC; and
one or more backbone servers configured to transfer copies of the DCC from the backbone data stores to one or more of the cinema servers of each of one or more of the cinema IT systems;
the backbone in cooperation with the one or more of the cinema IT systems configured to schedule and execute the transfers of the copies of the DCC to meet corresponding delivery deadlines while throttling a data rate of the transfer and/or pausing the transfer and/or inhibiting executing the transfer at times corresponding to:
the one or more of the cinema servers having a load higher than a threshold; and/or
the one or more cinema IT systems having a load higher than a threshold; and/or
a data communication link to the cinema IT system having traffic higher than a threshold.

24. The system according to claim 23, comprising a scheduler configured to:
determine the delivery deadline for delivering the item of the DCC to one of the cinema IT systems based at least in part on a scheduled show time for the item of digital content by the cinema IT system;

estimate an estimated amount of time required to transfer the copy of the DCC from the backbone data store to the cinema IT system; and determine a start time for the transfer that is earlier than the delivery deadline by at least the estimated amount of time.

25. The system according to claim 24, wherein the scheduler is configured to predict a load on the one or more of the cinema servers and/or the one or more cinema IT systems based on a schedule of show times for the cinema IT system and to base the start time at least in part on the predicted load.

\* \* \* \* \*